US008221692B2

United States Patent
Sorensen et al.

(10) Patent No.: US 8,221,692 B2
(45) Date of Patent: *Jul. 17, 2012

(54) RADIATIVE HEAT TRANSFER VIA FINS IN A STEAM REFORMER

(75) Inventors: Bob Sorensen, Hillsboro, OR (US);
Craig E. Evans, Portland, OR (US);
Brian Sonnichsen, Portland, OR (US)

(73) Assignee: ClearEdge Power, Inc., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,316

(22) Filed: Dec. 5, 2011

(65) Prior Publication Data

US 2012/0076697 A1  Mar. 29, 2012

Related U.S. Application Data

(62) Division of application No. 12/914,810, filed on Oct. 28, 2010, now Pat. No. 8,071,247.

(51) Int. Cl.
*B01J 8/00* (2006.01)
*B01J 19/00* (2006.01)

(52) U.S. Cl. ........ 422/198; 422/187; 422/625; 422/629; 422/643; 422/646; 422/649; 422/651; 48/61; 48/127.9; 423/648.1; 423/650; 423/651; 423/652; 423/655

(58) Field of Classification Search ........... 48/61, 127.9; 422/200, 198, 201, 203, 205, 659, 625, 629
See application file for complete search history.

(56) References Cited

U.S. PATENT DOCUMENTS

| | | | |
|---|---|---|---|
| 3,635,682 | A | 1/1972 | Vine et al. |
| 4,430,304 | A | 2/1984 | Spurrier et al. |
| 6,979,507 | B2 | 12/2005 | Edlund et al. |
| 8,038,968 | B2 | 10/2011 | Sorensen et al. |
| 2003/0082419 | A1 | 5/2003 | Berlowitz et al. |
| 2003/0223926 | A1 | 12/2003 | Edlund et al. |
| 2004/0062956 | A1 | 4/2004 | Goebel et al. |
| 2005/0241232 | A1 | 11/2005 | Reinke et al. |
| 2009/0214910 | A1 | 8/2009 | Brantley et al. |

FOREIGN PATENT DOCUMENTS

JP  60158294 A  8/1985

*Primary Examiner* — Kaity V. Handal
(74) *Attorney, Agent, or Firm* — Alleman Hall McCoy Russell & Tuttle LLP

(57) ABSTRACT

Embodiments are disclosed that relate to increasing radiative heat transfer in a steam reformer from an exterior shell which includes a diffusion burner to an interior reactor via angled fins coupled to the exterior shell. For example, one disclosed embodiment provides a steam reformer, comprising an exterior shell which includes a diffusion burner and angled fins, the angled fins extending away from an inner surface of the exterior shell and downward toward the diffusion burner. The steam reformer further comprises an interior reactor positioned at least partly within the exterior shell.

9 Claims, 5 Drawing Sheets

RADIATIVE HEAT TRANSFER VIA FINS IN A STEAM REFORMER

CROSS REFERENCE TO RELATED APPLICATIONS

The present application is a divisional of U.S. patent application Ser. No. 12/914,810, filed Oct. 28, 2010 and titled "Radiative Heat Transfer via Fins in a Steam Reformer," the entire contents of which are incorporated herein by reference.

TECHNICAL FIELD

The present disclosure relates to the field of reforming, and more particularly, to a methane steam reformer for generating hydrogen for use in a fuel cell.

BACKGROUND

In a steam reformer, under high temperatures (e.g., 400-800° C.) and in the presence of a catalyst (e.g., nickel), steam may react with a feed gas (e.g., methane) to generate a reformate (e.g., hydrogen) which may be used as fuel in a hydrogen fuel cell to generate electricity, for example. Because the reforming reaction is endothermic, a heat source is needed to maintain a temperature range at which the reaction can occur. In some examples, the steam reformer may include a burner outside of a reactor which heats the reactor and is fueled by the reformate.

SUMMARY

Accordingly, various embodiments are disclosed herein related to using an external shell for the steam reformer which includes a diffusion burner and angled fins in order to increase radiative heat transfer from the flame within the external shell (from the diffusion burner) to the interior reactor. For example, one disclosed embodiment provides a steam reformer comprising an exterior shell which includes a diffusion burner and angled fins, the angled fins extending away from an inner surface of the exterior shell and downward toward the diffusion burner. The steam reformer further comprises an interior reactor positioned at least partly within the exterior shell.

In such an example, the angled fins behave as a baffle to direct flow of the combustion gases (e.g., burning hydrogen) and as thermal radiation emitters. As such, an amount of heat transferred to the interior reactor may be at least partially controlled by a position, angle, and length of each angled fin coupled to an inner surface of the exterior shell. By controlling the amount of heat transferred to the interior reactor, a reforming reaction which occurs within the interior reactor may be driven toward the formation of more products, for example.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The following description relates to various embodiments of a steam reformer which includes an external shell with angled fins configured to allow a greater intensity of radiative heat to reach an interior reactor than a similar external shell without angled fins. As described in more detail below, such angled fins may be coupled to the exterior shell, for example, at locations and angles such that heat from combustion of gases rising from a diffusion burner positioned in a bottom portion of the external shell may be transferred to the fin and may be radiated to a desired location of the interior reactor. This may facilitate increased heating of the interior reactor in order to drive a reforming reaction in the interior reactor toward the formation of more products (e.g., hydrogen) compared to the same interior reactor surrounded by an external shell without the angled fins.

In some examples, the burner may be positioned below a reactor such that heat from combustion of a fuel, such as hydrogen generated by the reformer, rises up around the reactor or through a center portion of the reactor. Due to the buoyancy of hydrogen in air, the hydrogen flames from the burner may ascend rapidly resulting in a relatively low amount of heat transferred to the reactor, especially in a lower region of the reactor. Further, a length of the reactor may be limited by a space in which the reactor is used, for example, resulting in a relatively short length of time for the burning hydrogen to heat the reactor. As such, the reactor may not receive a desired amount of heat to facilitate the reforming reaction, especially in a lower region of the reactor where more heat is needed due to cooling of the reformate stream from the endothermic reforming reaction (e.g., when the reformate travels from a top end of the reactor to a bottom end of the reactor).

Figure 1:
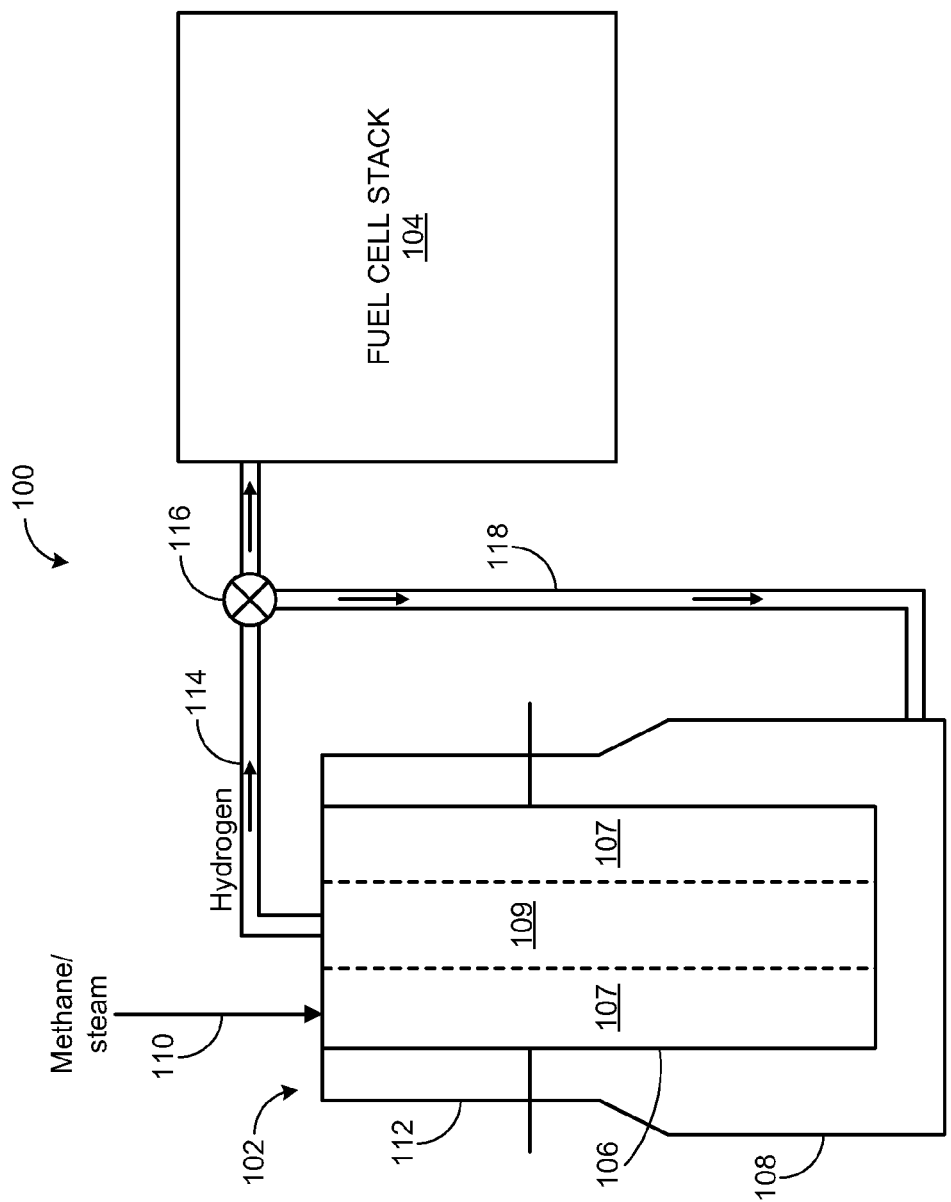
FIG. 1 shows a block diagram of a steam reforming system coupled to a fuel cell stack in accordance with an embodiment of the present disclosure.

FIG. 1 shows an example embodiment of a system 100 including a reformer 102 coupled to a fuel cell stack 104. Reformer 102 may generate a product stream that contains hydrogen gas, for example. Hydrogen that is generated in steam reformer 102 may be utilized, for example, by fuel cell stack 104 to generate electrical power. The hydrogen may be further utilized to fuel a diffusion burner positioned within an exterior shell 108 which surrounds an interior reactor 106 of the steam reformer 102. Reformer 102 may be a steam reformer, for example, which converts a mixture of steam and a feed gas such as methane to hydrogen and carbon monoxide and/or carbon dioxide. In other embodiments, reformer 102 may be an autothermal reformer.

In the example embodiment of FIG. 1, the interior reactor 106 is supplied with a mixture of feed gas (e.g., methane or other suitable reactant) and water at 110. The mixture of feed gas and water may be produced in any suitable manner. For the purpose of describing operation of the reactor, the examples described herein will assume the feed gas is methane. It should be understood, however, any suitable feed gas may be used. In some embodiments, the methane/water mixture may be converted to a gaseous mixture by a vaporizer (not shown) before entering interior reactor 106. In other embodiments, methane and water may be heated so that they are in gaseous form before they are mixed.

In some embodiments, the interior reactor 106 may have a cylindrical shape and a reaction chamber 107 within the interior reactor may have a hollow shape, such as the depicted ring shape, or other suitable shape that surrounds and conforms to the shape of the interior reactor. The reaction chamber 107 may be filled with a packing material. For example, the packing material may be a metal-based catalyst such as nickel which facilitates the reaction of feed gas and steam within reaction chamber 107. For example, in the presence of packing material and at high temperature (e.g., 750° C.), methane reacts with steam to form hydrogen and carbon monoxide via the following reversible reaction:

$$CH_4 + H_2O \leftrightarrow CO + 3H_2. \tag{1}$$

As will be described in more detail below with reference to FIGS. 2 and 3, exterior shell 108 includes a burner, such as a diffusion burner, for heating the reactor to a temperature for the reaction to occur. As shown in FIG. 1, exterior shell 108 surrounds a portion of the interior reactor extending from a bottom end of the interior reactor 106 partially toward a top end of the interior reactor 106 (e.g., the end where feed gas enters the interior reactor). Exterior shell may cover 60% of the outer wall, for example, when the interior reactor rests inside the exterior shell. Exhaust from combustion that occurs within a cavity formed by the external shell may be used to heat the feed gas/water mixture before it enters reaction chamber 107. In some embodiments, the reformer 102 may further include a recuperator 112 which surrounds a portion of the outer wall of the interior reactor 106 extending from a top portion of the external shell 108 toward the top end of the interior reactor. The recuperator may be used to heat or maintain a high temperature in the upper part of reaction chamber 107 using exhaust gas from the diffusion burner or exhaust gas from the fuel cell stack 104 to which the interior reactor 106 supplies fuel, for example. It will be understood that heat may be provided to interior reactor 106 in any other suitable manner, and that the above-described embodiment is not intended to be limiting in any manner.

Reformate (e.g., hydrogen gas) generated in reaction chamber 107 of the interior reactor 106 exits the reaction chamber at a bottom portion of the interior reactor and travels through an inner chamber 109 before exiting the interior reactor 106 at its top end. As shown in the example of FIG. 1, hydrogen is routed from the reformer to the fuel cell stack 104 via a first pipe 114. The first pipe 114 may have a diameter in accordance with, for example, a desired amount and/or pressure of hydrogen to be supplied to the fuel cell stack 104 based on a flow rate and pressure of hydrogen generated in the interior reactor 106. The first pipe 114 may be made of any suitable material for transporting hydrogen, for example, stainless steel. It will be understood that the term "pipe" signifies any suitable structure for carrying gases such as a tube, a hose, a manifold, etc.

Fuel cell stack 104 may be configured to generate power from a reaction between the supplied fuel (e.g., hydrogen) and oxidant for driving an external load. In some embodiments, the fuel cell stack 104 may include a plurality of fuel cells that may be electrically connected to generate a higher voltage. For example, the fuel cell stack 104 may include a plurality of fuel cells electrically connected in series.

System 100 further includes a valve 116 for regulating a supply of a fuel to the fuel cell stack 104. Valve 116 may be controlled via a controller (not shown) to route a first portion of the hydrogen generated in the interior reactor 106 to the fuel cell stack 104. Valve 116 may be further controlled to route a second portion of hydrogen to the diffusion burner (not shown) positioned within the bottom portion of the external shell 108 via a second pipe 118. For example, valve 116 may be a three-way valve. Second pipe 118 may have similar characteristics (e.g., diameter, material, etc.) as the first pipe 114, for example. It will be understood that the depicted fuel delivery system (e.g., first and second pipes 114 and 118 and valve 116) is shown for the purpose of example, and that any other suitable component or components may be utilized to supply hydrogen to the diffusion burner and the fuel cell stack 104.

Figure 2:
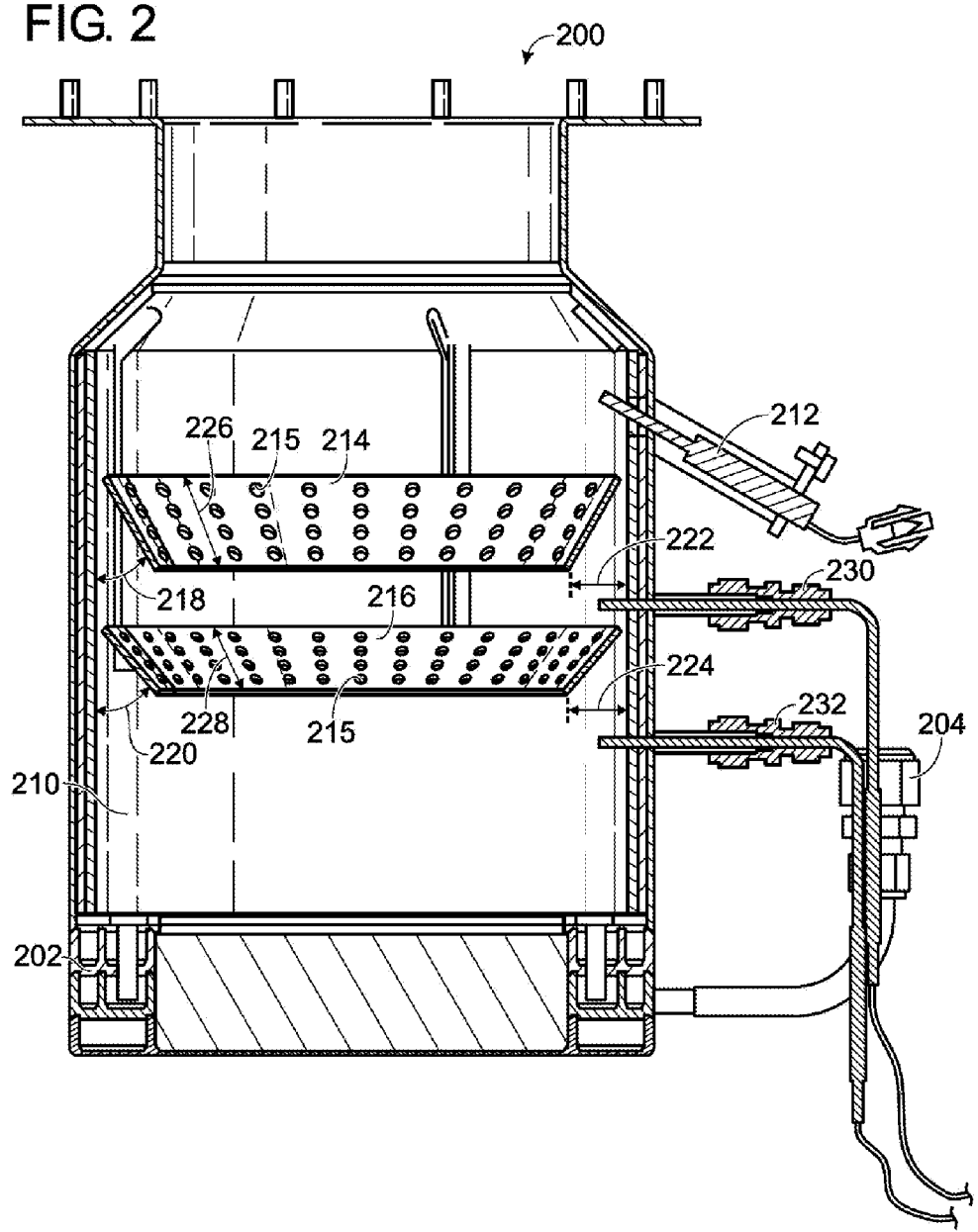
FIG. 2 schematically shows a cross-sectional view taken along an axial direction of an example embodiment of an exterior shell that may be used in a steam reformer.
Figure 3:
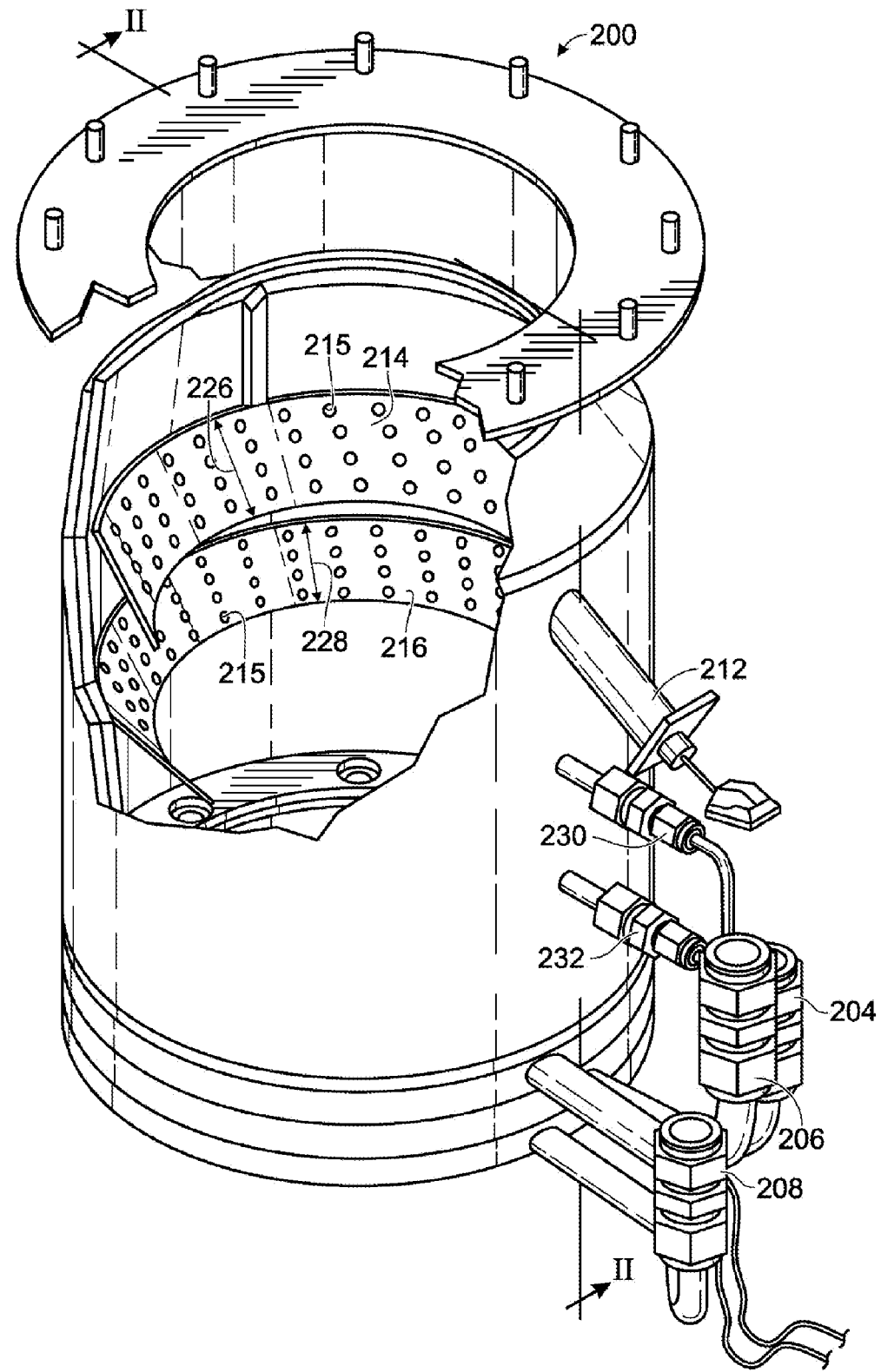
FIG. 3 schematically shows another view of the exterior shell of FIG. 2 in accordance with an embodiment of the present disclosure.

Continuing to FIGS. 2 and 3, detailed examples of an embodiment of an external shell 200, such as external shell 108 of FIG. 1, are shown. As depicted in the examples of FIGS. 2 and 3, external shell 200 has a cylindrical shape with a tapered portion near a top end of the external shell resulting in a diameter at the top end less than that of a diameter at a bottom end of the external shell, similar to the shape of a milk can, for example. External shell 200 may be formed of any suitable material that is capable of withstanding the high temperature of burning hydrogen and insulating the interior reactor. For example, the exterior shell may be made of high nickel content stainless steel alloy.

As shown in the examples of FIGS. 2 and 3, which are drawn to scale, a diffusion burner 202 is positioned in a bottom portion of the external shell. Hydrogen from the interior reactor is fed to diffusion burner 202 via inlet 204. As shown in the example FIG. 3, external shell 200 may include additional inlets 206 and 208 for supplying diffusion burner 202 with ambient air and/or another combustible fuel, such as a hydrocarbon or alcohol fuel, for example. In some embodiments, hydrogen and air are mixed within the diffusion burner to form an oxygenated combustible fuel stream before being routed to the cavity 210 which is formed between the external shell 200 and an interior reactor (not shown in FIGS. 2 and 3) when the external shell surrounds the interior reactor, for example. In other embodiments, the fuel stream may be mixed before entering the burner.

Diffusion burner 202 routes the combustible fuel (e.g., hydrogen and air) into cavity 210 where it is ignited via a spark from igniter 212. Flames from the burning hydrogen rise upward toward the top of the external shell 200.

Further, external shell 200 includes two angled fins, first angled fin 214 (the upper fin) and second angled fin 216 (the lower fin) which are shaped to conform to the exterior shell. For example, the depicted fins are ring-shaped to conform to the shape of the depicted exterior shell. In other embodiments, the external shell may include one angled fin or more than two angled fins. Each angled fin may extend the same radial distance from the inner surface of the exterior shell, as shown in FIGS. 2 and 3. For example, angled fins 214 and 216 extend to a radial distance 222 that is 90% of a distance 224 between the inner surface of the exterior shell and an outer surface of the interior reactor (when the exterior shell surrounds the interior reactor). In other examples, the angled fins may extend to different radial distances across the cavity. Furthermore, in the example of FIGS. 2 and 3, angle 218 between angled fin 214 and the inner surface of the exterior shell is less than angle 220 between angled fin 216 and the inner surface of the exterior shell. As such, a length 226 of the upper fin is greater than a length 228 of the lower fin. It should be understood that FIGS. 2 and 3 are merely examples, and an external shell may include any suitable number of angled fins.

Angled fins 214 and 216 may be made of solid or perforated metal or ceramic material. In such an embodiment, the angled fins behave as baffles to the flow of the combustion gases, as combustion gases heat extraction devices, and as directed thermal radiation emitters. For example, the angled fins receive energy from the combustion gases and from any other radiating surface in the burner cavity. The fins may be solid or may contain some perforations. The solid part of the fin behaves as a baffle to impede the flow of the combustion gases and introduce recirculation to the burner chamber thereby increasing convective heat transfer. When perforations are used, the perforations 215 in the angled fins allow for combustion gases to pass through the fins and, as the combustion gases pass through the perforations, energy is transferred convectively to the fins. This energy may then be transferred via radiation to the interior reactor. Size, shape, and location of the perforations 215 in each angled fin may be determined such that convective heat transfer to the fins from the combustion gases is increased while the cumulative radiation heat transfer through the perforations is decreased, for example. As such, each angled fin coupled to the external shell may have perforations with different characteristics (e.g., perforations are larger on the bottom fin than the top fin). As an example the perforations may be round holes ⅛ inch in diameter.

Furthermore, position, length and angle of the angled fins may be determined such that a desired amount of heat is radiated to a desired location of the interior reactor in order to drive a reforming reaction in the interior reactor toward the formation of more products and based on a length of the reactor, for example. As an example, the angled fins may be located near a middle region of the exterior shell which corresponds to a lower region of the interior reactor where more heat may be needed due to cooling of the reformate stream from the endothermic reforming reaction. As such, the interior reacted may be heated to a desired temperature at a desired location without extending the length of the reformer.

Exterior shell 200 further includes temperature sensors 230 and 232 positioned below angled fins 214 and 216, respectively. As shown most clearly in FIG. 2, temperature sensors 230 and 232 extend from outside of the exterior shell 200 and into the cavity 210 toward the interior reactor. In embodiments which include more or less angled fins, more or less temperature sensors may be included, for example, such that each angled fin has a corresponding temperature sensor. The temperature sensors may be used to determine temperature in the vicinity of each temperature sensor so that more or less air and/or hydrogen may be delivered to the diffusion burner in order to increase or decrease temperature based on a desired temperature in the vicinity of each angled fin, for example.

Figure 4:
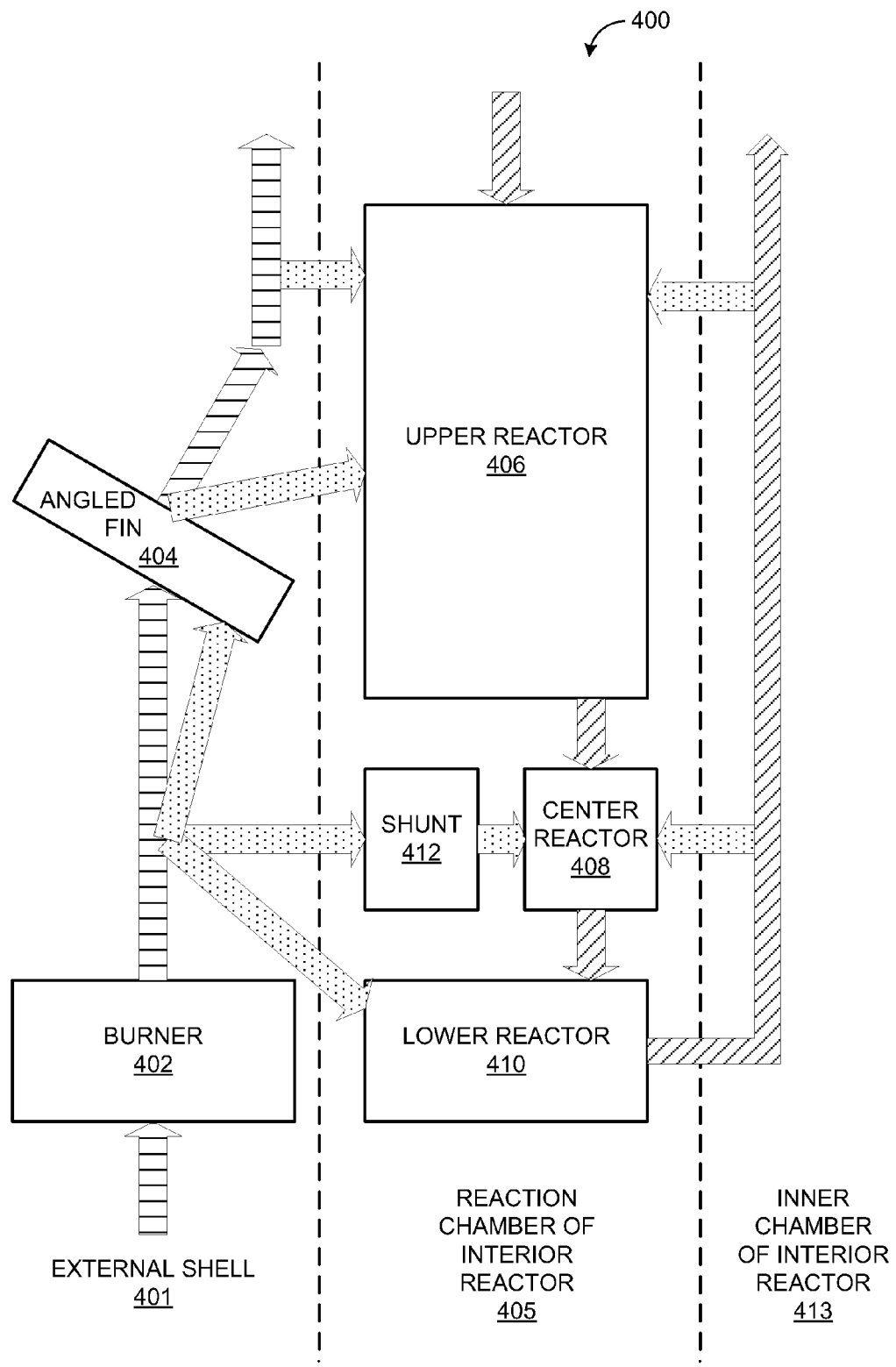
FIG. 4 shows a block diagram illustrating flows of gas and energy in a steam reformer in accordance with an embodiment of the present disclosure.

FIG. 4 shows gas and energy flow within an embodiment of a steam reformer 400, such as steam reformer 102 described above with reference to FIG. 1. For example, energy is provided by combustion flames contained within the region formed between the external shell and the interior reactor as well as by the reformate that flows through the interior reactor.

A path of the burner gas (e.g., hydrogen and air) through the external shell 401 is indicated by the arrows containing horizontal lines in FIG. 4. As illustrated, the burner gas flows through burner 402 and upward toward angled fin 404. Angled fin 404 extracts heat from the combustion gasses and focuses radiation directed at an angle toward an upper reactor region 406 of the interior reactor before it flows out of the external shell and into the recuperator.

A path of the reformate gas through the interior reactor is indicated by the arrows containing diagonal lines in FIG. 4. As illustrated, the reformate gas (e.g., hydrogen) first flows through a reaction chamber of the interior reactor 405, the reaction chamber including upper 406, center 408, and lower 410 regions. The reformate then exits the reaction chamber and enters the inner chamber of the interior reactor 413. The reformate gas is then routed from a bottom portion of the interior reactor to a top portion of the interior reactor where it is routed to a fuel cell and/or back to the diffusion burner, as described above.

Further, paths of energy flows used to bring about a reforming reaction are indicated by arrows containing dots in FIG. 4. As described above, the reforming reaction which converts methane and steam to hydrogen in the presence of a catalyst occurs at high temperatures (e.g., 400-800° C.). Thus, the burner 402 is provided outside of the interior reactor in order to heat the interior reactor. As shown in FIG. 4, the angled fin 404 may be positioned such that the interior reactor receives a greater amount of heat than it would in a similar steam reformer that does not include angled fins.

The steam reformer 400 of FIG. 4 further includes a radiative shunt 412 near the central reactor region 408 which is configured to allow a greater intensity of radiative heat to reach farther into a reactor than a similar reactor without a shunt, as indicated by the arrow.

Figure 5:
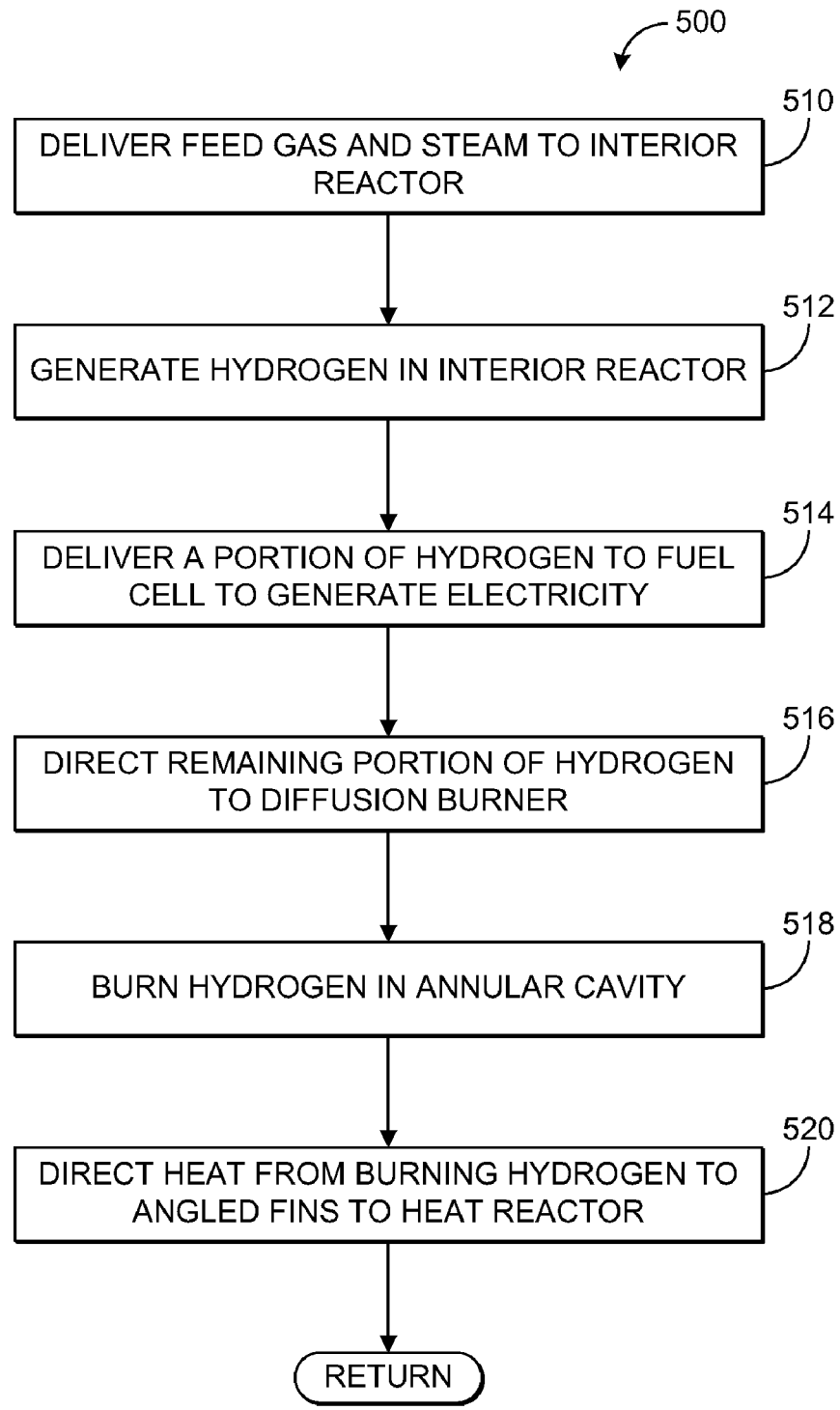
FIG. 5 shows a flow chart illustrating a method for a steam reformer coupled to a fuel cell stack in accordance with an embodiment of the present disclosure.

The flow chart in FIG. 5 illustrates an embodiment of a method 500 for a steam reformer coupled to a fuel cell stack, such as steam reformer 102 and fuel cell stack 104 shown in FIG. 1.

At 510 of method 500, feed gas and steam are delivered to the interior reactor. As described above, the feed gas may be methane or another suitable reactant. Hydrogen is then generated at 512 of method 500 as the feed gas travels through the interior reactor and is converted to hydrogen in the presence of a catalyst and high temperatures.

Once hydrogen is generated, a first portion of the hydrogen is delivered to the fuel cell stack to generate electricity at 514. For example, a first pipe routes the hydrogen to the fuel cell stack and the amount of hydrogen routed to the fuel cell stack is controlled via adjustment of a valve. A second portion of hydrogen is routed to an inlet of the diffusion burner at 516 of method 500. For example, the valve may be controlled to route the second portion of hydrogen to the diffusion burner via a second valve.

Hydrogen that is routed to the diffusion burner is then burned in the cavity formed by the exterior shell at 518 of method 500. Heat from the hydrogen flames is directed toward the angled fins to heat the reactor at 520 of method 500.

Thus, an external shell which includes one or more angled fins may be used to increase an amount of heat transferred to an interior reactor which it surrounds without extending the length of the reformer compared to an external shell that does not have angled fins. For example, the amount of heat transferred to the interior reactor may be at least partially controlled by a position, angle, and length of each angled fin coupled to an inner surface of the exterior shell. By controlling an amount of heat transferred to the interior reactor via the angled fins, a reforming reaction which occurs within the interior reactor may be driven toward the formation of more products.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A steam reformer, comprising:
   an exterior shell which includes a diffusion burner and angled fins, the angled fins extending away from an inner surface of the exterior shell and downward toward the diffusion burner, the exterior shell forming a cavity in which combustion occurs; and
   an interior reactor positioned at least partly within the exterior shell, wherein at least a portion of the cavity extends between the angled fins and the interior reactor.

2. The steam reformer of claim 1, wherein the exterior shell includes two angled fins which are ring shaped, and wherein an angle between an upper of the two angled fins and the exterior shell is less than an angle between a lower of the two angled fins and the exterior shell.

3. The steam reformer of claim 1, wherein the angled fins extend to a radial distance that is 90% of a distance between the inner surface of the exterior shell and an outer surface of the interior reactor.

4. The steam reformer of claim 1, wherein the diffusion burner is in a bottom portion of the exterior shell.

5. The steam reformer of claim 1, further comprising a first pipe extending from a top end of the interior reactor through which a first portion of hydrogen generated in the interior reactor is routed to a fuel cell coupled to the steam reformer.

6. The steam reformer of claim 5, further comprising a second pipe coupled to the first pipe via a valve, the second pipe routing a second portion of hydrogen generated in the interior reactor to an inlet of the diffusion burner for fuel.

7. The steam reformer of claim 1, further comprising temperature sensors positioned below each angled fin, the temperature sensors extending from outside the exterior shell toward the interior reactor.

8. The steam reformer of claim 1, wherein a portion of the interior reactor not surrounded by the exterior shell is surrounded by a recuperator.

9. The steam reformer of claim 1, wherein the angled fins are made of solid or perforated metal or ceramic material, the perforations such that combustion gases pass through.

* * * * *